US008082265B2

(12) United States Patent
Carlson et al.

(10) Patent No.: US 8,082,265 B2
(45) Date of Patent: Dec. 20, 2011

(54) DATABASE QUERY PROCESSING WITH DYNAMICALLY ACTIVATED BUFFERS

(75) Inventors: David Glenn Carlson, Rochester, MN (US); Wei Hu, Middleton, WI (US); Kevin James Kathmann, Rochester, MN (US); Shantan Kethireddy, Rolling Meadows, IL (US); Andrew Peter Passe, Rochester, MN (US); Ulrich Thiemann, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 502 days.

(21) Appl. No.: 12/056,344

(22) Filed: Mar. 27, 2008

(65) Prior Publication Data

US 2009/0248618 A1    Oct. 1, 2009

(51) Int. Cl.
*G06F 7/00* (2006.01)
(52) U.S. Cl. ...................................................... 707/769
(58) Field of Classification Search .................. 707/769
See application file for complete search history.

(56) References Cited

U.S. PATENT DOCUMENTS

| 5,355,029 | A | 10/1994 | Houghton et al. | |
|---|---|---|---|---|
| 6,910,032 | B2 * | 6/2005 | Carlson et al. | 707/769 |
| 6,999,958 | B2 | 2/2006 | Carlson et al. | |
| 2006/0080285 | A1 | 4/2006 | Chowdhuri | |
| 2006/0218123 | A1 | 9/2006 | Chowdhuri et al. | |

OTHER PUBLICATIONS

Acker, Ralph et al, "Parallel Query Processing in Databases on Multicore Architectures", Algorithms and Architectures for Parallel Processing (lecture notes in computer science), Springer Berlin Heidelberg, Berlin, Heidelberg, vol. 5022,Jun. 11, 2007, pp. 2-13.
Babu, Shivnath et al, "Proactive Re-optimization with Rio", Proceedings of the 2005 ACM SIGMOD International Conference on Management of Data, Jun. 14, 2005, pp. 936-938 http://portal.acm.org/citation.cfmid=1066294>.
Ng, Kenneth W. et al, "Dynamic Query Re-Optimization", Scientific and Statistical Database Management, 1999, Eleventh International Conference on Cleveland, OH, USA, Jul. 23-30, 1999, Los Alamitos, CA, USA, IEEE Computer Society, US, Jul. 28, 1999, pp. 264-273.
Bouganim, Luc et al, "Dynamic Query Scheduling in Data Integration Systems", Data Engineering, 2000 Proceedings, 16th International Conference on San Diego, CA, USA, Feb. 29 to Mar. 3, 2000, Los Alamitos, CA, USA, IEEE Computer Society, US, Feb. 29, 2000, pp. 425-434.
Babu, Shivnath et al, "Adaptive Caching for Continuous Queries", Proceedings of the 21st International Conference on Data Engineering (ICDE 2005), pp. 118-129 http://ieeexplore.ieee.org/stamp/stamp.jsp?arnumber=01410111>.
Markl, Volker et al, "Robust Query Processing through Progressive Optimization", Proceedings of the 2004 ACM SIGMOD International Conference on Management of Data Table of Contents, 2004, pp. 659-670 http://portal.acm.org/citation.cfm?id=1007642>.

* cited by examiner

*Primary Examiner* — Apu Mofiz
*Assistant Examiner* — Ajith Jacob
(74) *Attorney, Agent, or Firm* — Wood, Herron & Evans, LLP

(57) ABSTRACT

A method, apparatus and program product dynamically activate and/or deactivate buffers during execution of a database query. The dynamic deactivation and activation is based on the monitoring of information associated with the consumption of data by a plurality of threads during execution of an access plan for the database query. By doing so, the selection of a less optimal buffer position during optimization may be replaced with a more optimal buffer position during runtime, often resulting in improved query performance and parallelism.

25 Claims, 7 Drawing Sheets

DATABASE QUERY PROCESSING WITH DYNAMICALLY ACTIVATED BUFFERS

FIELD OF THE INVENTION

The invention relates to computers and computer systems, and in particular, to the utilization of buffers to process database queries.

BACKGROUND OF THE INVENTION

Databases are used to store information for an innumerable number of applications, including various commercial, industrial, technical, scientific and educational applications. Many databases are relational databases, which organize information into formally-defined tables consisting of rows (i.e., records) and columns (i.e., fields), and which are typically accessed using a standardized language such as Structured Query Language (SQL).

Database management systems (DBMS's) are the computer programs that are used to access the information stored in the databases and to process searches, or queries, against the databases. To execute the query, many DBMS's perform query optimization, in which multiple execution plans or access plans for satisfying the database query are examined by a query optimizer to determine the most efficient way to execute the query. One type of optimization that may be utilized is parallel query execution.

Parallel query execution may include parallel processing of multiple queries. In particular, multiple queries may be concurrently executed by various processors and/or computers in a database management system. When a large number of users attempt to access the database, the parallel processing of multiple queries often decreases wait times for individual users and improves overall database throughput. Furthermore, parallel query execution may include parallel processing of an individual query, in which various sub-operations in the query are concurrently executed. Furthermore, parallel query execution may include the processing of a portion of an individual query in serial or in another non-parallel manner while another portion of the individual query is processed in parallel.

To implement parallelism, multiple threads and a buffer (e.g., a temporary buffer) are typically utilized. Threads generally represent independent paths of execution for a database query that are capable of being processed in parallel. A temporary buffer is often a temporary object or unsorted data structure that is utilized to store intermediate rows during execution of a database query. A temporary buffer is often viewed as a serialization point between parallel and nonparallel portions of a query. A buffer pool structure may be utilized to provide the parallel threads with data to consume. In some designs, a buffer pool structure may be organized with other components that are utilized during execution of into an execution tree. In such designs, the data for the threads may be produced from a subtree of the execution tree, which includes the buffer and functions as a feeding tree.

One difficulty associated with implementing parallel query execution in many designs is determining the optimal position to place a buffer in an execution tree. For example, there may be multiple suitable positions for the buffer, and to select a position, the query optimizer may perform costing comparisons to pick the best location based on the total cost to insert the buffer. Once the buffer position for the buffer is chosen, the buffer position is added to the execution plan and the query is executed with the buffer positioned at the chosen position in the execution plan. A buffer can operate as a serialization point in an execution plan, and as a result, improper placement of the buffer can result in sub-optimal performance. If, for example, the rate at which results are produced and added to the buffer is greater than the rate at which the results are consumed, the buffer can overflow and stall upstream query processing. On the other hand, if the rate at which results are produced and added to the buffer is greater than the rate at which the results are consumed, downstream operations can become starved for results.

Special tools and instrumentalities may be utilized to monitor the consumption of data by the threads during execution of the database query (i.e., runtime) to determine how well a buffer is working at a selected buffer position. However, even if a problem is detected, the DBMS is typically "stuck" with the selected buffer position during the current execution. Some conventional techniques may note that the selected buffer position is less optimal so that the next time the query is received that buffer position is not selected by the optimizer during optimization of that query, but generally the DBMS is stuck with the selected buffer position during the current execution of the database query.

Less optimal buffer positions are often selected because buffer positions are selected by the query optimizer based on cost estimation and estimates may be based on errors. As such, a more optimal buffer position may have been neglected due to the incorrect cost estimation, often resulting in data that may be consumed too quickly or too slowly by the threads, a waste in resources, and a decrease in performance.

Therefore, a need exists in the art for an improved manner of implementing parallelism in the execution of database queries, and in particular, for an improved manner of optimizing the locations of buffers used in processing database queries.

BRIEF SUMMARY OF THE INVENTION

The invention addresses these and other problems associated with the prior art by providing a program product, an apparatus, and a method that are capable of dynamically activating and/or deactivating buffers during execution of a database query. The dynamic deactivation and activation is based on the monitoring of information associated with the consumption of data by a plurality of threads during execution of an access plan for the database query. By doing so, the selection of a less optimal buffer position during optimization may be replaced with a more optimal buffer position during runtime, often resulting in improved query performance and parallelism.

Consistent with the invention, a method, apparatus and program product may execute an access plan for the database query using the plurality of threads. The access plan includes a plurality of buffer positions, with a first buffer at a first buffer position activated to buffer intermediate results during execution of the access plan. The method, apparatus and program product may also monitor information associated with the consumption of data by the plurality of threads during execution of the access plan. Moreover, they may dynamically deactivate the first buffer at the first buffer position and activate a second buffer at a second buffer position based on the monitoring to improve the consumption of data by the plurality of threads during execution of the access plan, and continue to execute the access plan after the second buffer is activated such that intermediate results are buffered at the second buffer position by the second buffer instead of at the first buffer position by the first buffer. An apparatus may include a processor, a memory, and program code resident in the memory and configured to be executed by the processor, while a program product may include program code borne on a recordable computer readable medium.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION OF THE INVENTION

Embodiments consistent with the invention dynamically activate and/or deactivate buffers during execution of a database query to optimize the location of a buffer used by an execution plan for the database query. The dynamic deactivation and activation is based on the monitoring of information associated with the consumption of data by a plurality of threads during execution of an access plan for the database query. Multiple selectively activatable buffers may be part of a group of buffers disposed at different buffer positions, such that one buffer in the group can be activated at any given time to effectively change the location of the buffer used by the execution plan. Moreover, as will be discussed in greater detail below, a push model and/or a pull model may be utilized consistent with the principles of the present invention to dynamically optimize the buffer position used by a database query.

Figure 1:
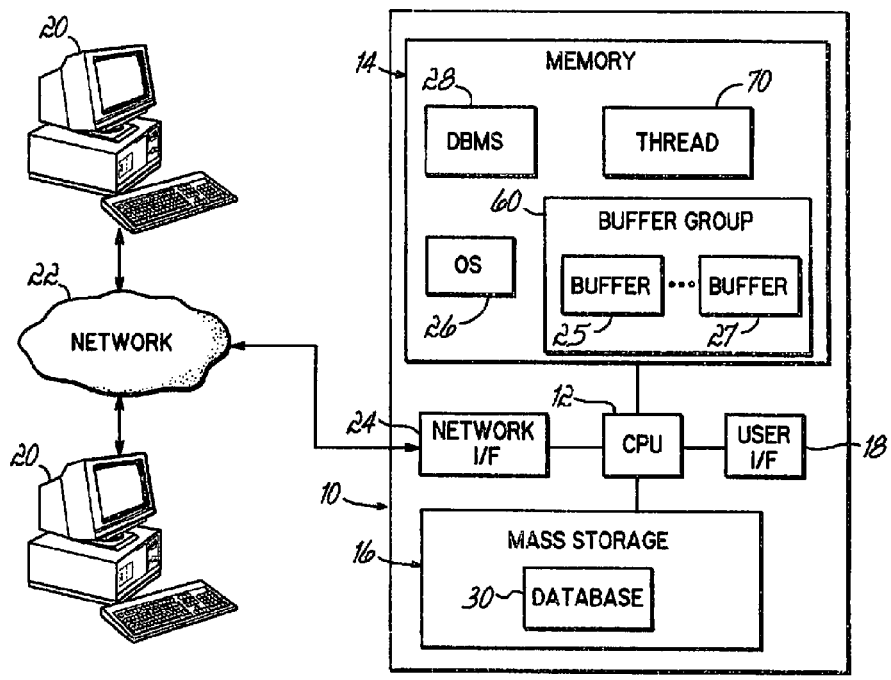
FIG. 1 is a block diagram of a networked computer system incorporating a database management system within which is implemented dynamic deactivation and activation of buffers consistent with the invention.

Turning now to the Drawings, wherein like numbers denote like parts throughout the several views, FIG. 1 illustrates an exemplary hardware and software environment for an apparatus 10 suitable for implementing a database management system incorporating dynamic deactivation and activation of buffers consistent with the invention. For the purposes of the invention, apparatus 10 may represent practically any type of computer, computer system or other programmable electronic device, including a client computer, a server computer, a portable computer, a handheld computer, an embedded controller, etc. Moreover, apparatus 10 may be implemented using one or more networked computers, e.g., in a cluster or other distributed computing system. Apparatus 10 will hereinafter also be referred to as a "computer," although it should be appreciated that the term "apparatus" may also include other suitable programmable electronic devices consistent with the invention.

Computer 10 typically includes a central processing unit (CPU) 12 including one or more microprocessors coupled to a memory 14, which may represent the random access memory (RAM) devices comprising the main storage of computer 10, as well as any supplemental levels of memory, e.g., cache memories, non-volatile or backup memories (e.g., programmable or flash memories), read-only memories, etc. In addition, memory 14 may be considered to include memory storage physically located elsewhere in computer 10, e.g., any cache memory in a processor in CPU 12, as well as any storage capacity used as a virtual memory, e.g., as stored on a mass storage device 16 or on another computer coupled to computer 10.

Resident in memory 14 may be at least one buffer such as buffers 25 and 27 and a plurality of threads 70. The buffers may be part of a buffer group such as buffer group 60. In particular, buffer group 60 may include one or more buffers such as buffers 25 and 27 so that a less optimal activated buffer 25 may be deactivated and a more optimal buffer 27 may be activated. Each buffer in the buffer group 60 may be associated with a buffer position and the buffers may be activated and/or deactivated at the buffer position. Buffer group 60 may be added to an execution plan 50 and utilized to provide data to threads 70. Although threads 70 are illustrated as resident in memory 14, threads 70 may alternatively be illustrated between CPU 12 for the executing code and memory 14 for their infrastructure information.

Computer 10 also typically receives a number of inputs and outputs for communicating information externally. For interface with a user or operator, computer 10 typically includes a user interface 18 incorporating one or more user input devices (e.g., a keyboard, a mouse, a trackball, a joystick, a touchpad, and/or a microphone, among others) and a display (e.g., a CRT monitor, an LCD display panel, and/or a speaker, among others). Otherwise, user input may be received via another computer or terminal, e.g., via a client or single-user computer 20 coupled to computer 10 over a network 22. This latter implementation may be desirable where computer 10 is implemented as a server or other form of multi-user computer. However, it should be appreciated that computer 10 may also be implemented as a standalone workstation, desktop, or other single-user computer in some embodiments.

For non-volatile storage, computer 10 typically includes one or more mass storage devices 16, e.g., a floppy or other removable disk drive, a hard disk drive, a direct access storage device (DASD), an optical drive (e.g., a CD drive, a DVD drive, etc.), and/or a tape drive, among others. Furthermore, computer 10 may also include an interface 24 with one or more networks 22 (e.g., a LAN, a WAN, a wireless network, and/or the Internet, among others) to permit the communication of information with other computers and electronic devices. It should be appreciated that computer 10 typically includes suitable analog and/or digital interfaces between CPU 12 and each of components 14, 16, 18, and 24 as is well known in the art.

Computer 10 operates under the control of an operating system 26, and executes or otherwise relies upon various computer software applications, components, programs, objects, modules, data structures, etc. For example, a database management system (DBMS) 28 may be resident in memory 14 to access a database 30 resident in mass storage 16. Moreover, various applications, components, programs, objects, modules, etc. may also execute on one or more processors in another computer coupled to computer 10 via a network, e.g., in a distributed or client-server computing environment, whereby the processing required to implement the functions of a computer program may be allocated to multiple computers over a network.

In general, the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of computer readable signal bearing media used to actually carry out the distribution. Examples of computer readable signal bearing media include but are not limited to recordable type media such as volatile and non-volatile memory devices, floppy and other removable disks, hard disk drives, magnetic tape, optical disks (e.g., CD-ROMs, DVDs, etc.), among others, and transmission type media such as digital and analog communication links.

In addition, various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Those skilled in the art will recognize that the exemplary environment illustrated in FIG. 1 is not intended to limit the present invention. Indeed, those skilled in the art will recognize that other alternative hardware and/or software environments may be used without departing from the scope of the invention.

Figure 2:
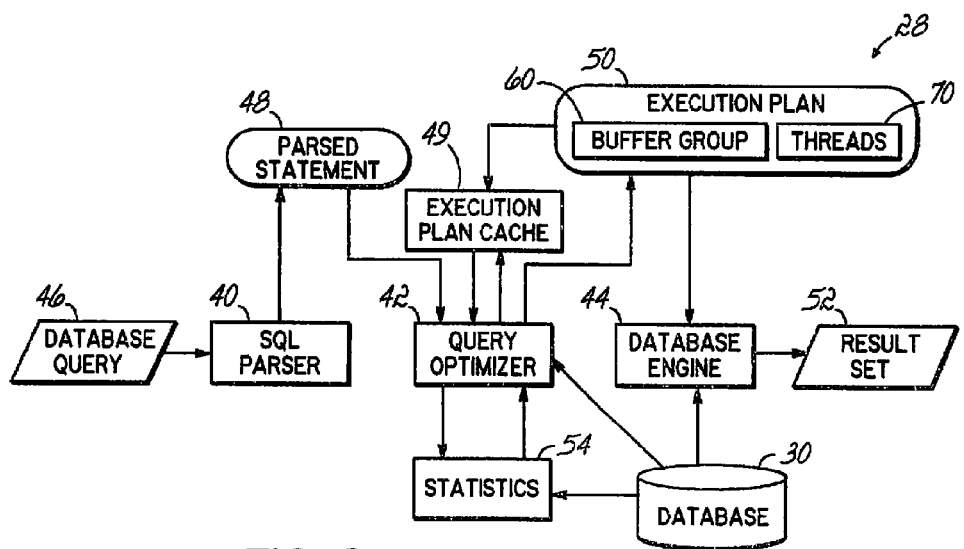
FIG. 2 is a block diagram illustrating the principal components and flow of information therebetween in the database management system of FIG. 1.

FIG. 2 next illustrates in greater detail the principal components in one implementation of DBMS 28. The principal components of DBMS 28 that are generally relevant to query execution are a Structured Query Language (SQL) parser 40, query optimizer 42 and database engine 44. SQL parser 40 receives from a user (or more typically, an application executed by that user) a database query 46, which in the illustrated embodiment, is provided in the form of an SQL statement. SQL parser 40 then generates a parsed statement 48 therefrom, which is passed to optimizer 42 for query optimization. As a result of query optimization, an execution or access plan 50 is generated.

The generated execution plan may include a plurality of buffer positions with buffers, for example, buffers 25 and 27 from buffer group 60, at the plurality of buffer positions and a plurality of threads 70. Once generated, execution plan 50 may be forwarded to an execution plan cache 49 to be stored for future use and to database engine 44 for execution of the database query on the information in database 30. The result of the execution of the database query is typically stored in a result set, as represented at block 52. To facilitate the optimization of queries, DBMS 28 may also include statistics 54, which may be statistical information that is gathered, created, and/or analyzed using database 30 for query optimizer 42.

In the context of the invention, database engine 44 may begin to execute access plan 50 to execute database query 46. Based on access plan 50, buffer 25 from buffer group 60 may be activated at a buffer position in the execution tree of query 46 and depicted as a buffer node in the execution tree. As such, the intermediate rows of query 46 may be temporarily stored in buffer 25 and used to provide data to threads 70 for consumption.

During execution, database engine 44 may monitor information associated with the consumption of data by threads 70. Monitoring may, alternatively, be a function of activated buffer 25. For example, while the activated buffer 25 is performing its assigned instructions, it may also perform additional instructions to monitor the work (e.g., idle time, number of threads, etc.) performed below and above activated buffer 25. As such, activated buffer 25 can monitor the non-parallel and parallel portions of the execution tree.

Next, database engine 44 may compare the consumption rate to the production rate, and vice versa, to gauge how balanced the rates are with respect to each other. The consumption rate is based on the monitored information and is indicative of how often threads 70 consume the data. The production rate is also based on the monitored information and is indicative of how often the data is produced for consumption. A greater consumption rate may indicate that threads 70 need more data while a greater production rate may indicate that threads 70 need less data. To provide threads 70 with more or less data during runtime, the buffer that is activated may be dynamically adjusted by database engine 44, as this dynamic adjustment may in turn adjust the feeding tree (e.g., expanding the feeding tree, shrinking the feeding tree, etc.) that provides data to threads 70.

Nonetheless, based on the monitored information, if database engine 44 determines that the buffer that is activated should be dynamically adjusted, database engine 44 may deactivate activated buffer 25 and may dynamically activate another buffer, such as buffer 27, in buffer group 60 at a different buffer position. The buffer that is activated depends on whether more or less data is desired based upon the monitored information. Afterwards, database engine 44 may continue to execute access plan 50, with the intermediate results buffered at the second buffer position by buffer 27 instead of at the first buffer position by buffer 25.

Thus, those of ordinary skill in the art may appreciate that consistent with the principles of the present invention a less optimal buffer that is selected during optimization for activation by estimation may be dynamically replaced with a more optimal buffer based upon information monitored from the actual execution of the query. The buffers that are activated and/or deactivated may be part of a group of buffers (e.g., a staged buffer group) and located among suitable positions in the execution tree of the query.

Moreover, the buffer adjustment may be performed during runtime without having to re-optimize or restart execution of the database query, which preserves any previously performed query processing. As such, the incorrect execution plan may be dynamically corrected during execution instead of the next time the query is optimized. Furthermore, by dynamically adjusting the buffer that is activated, the rate of consumption by the parallel execution threads may be better balanced with the rate of production from the feeding tree.

Figure 3:
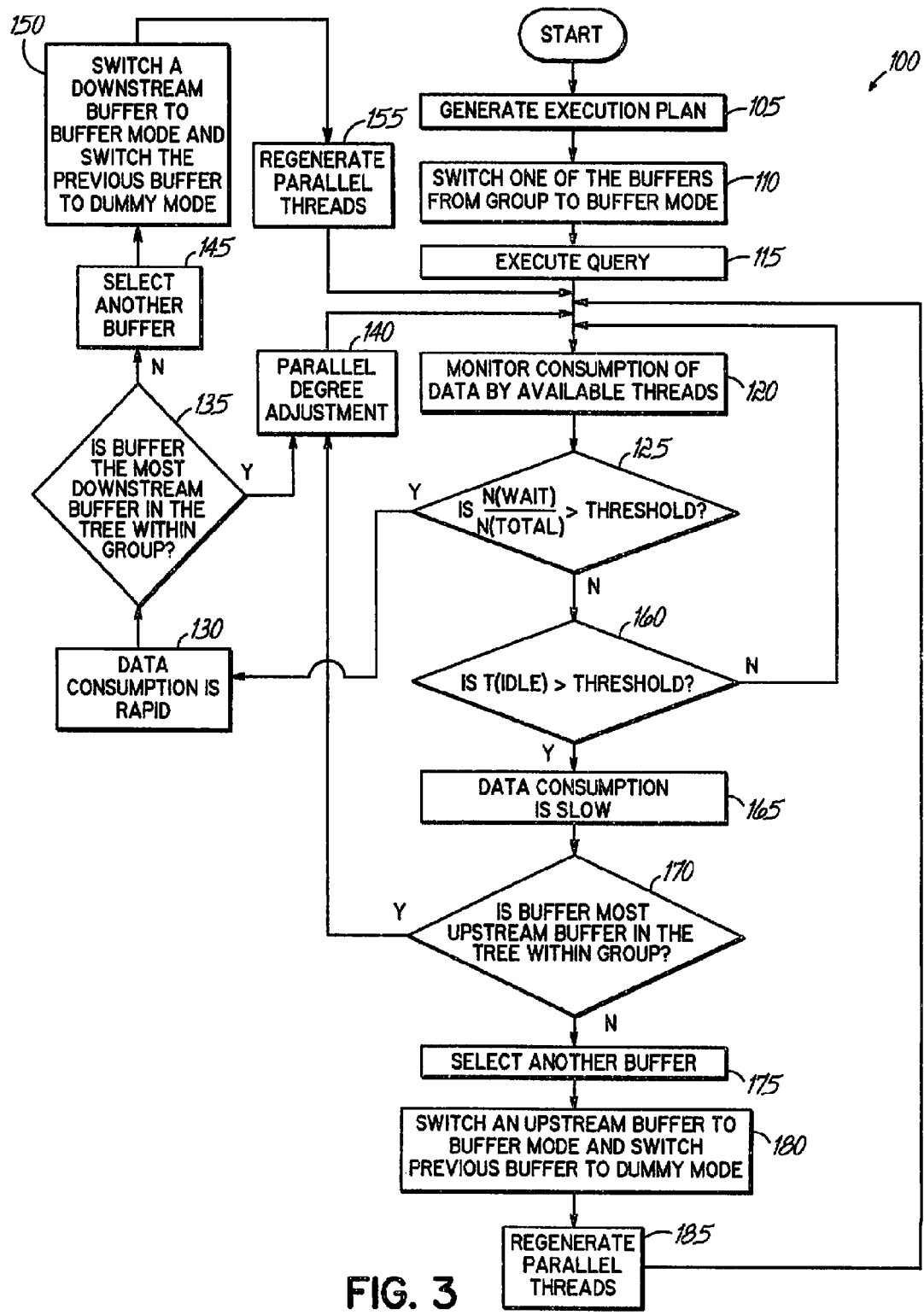
FIG. 3 is a flowchart illustrating the program flow of one implementation of a dynamic buffer activation routine for use in the computer system of Fig.

Turning to FIG. 3, FIG. 3 is a flowchart of an exemplary dynamic deactivation and activation of buffers routine 100 for dynamically deactivating a buffer at a buffer position and activating another buffer at a different buffer position. To facilitate the discussion of routine 100, reference will be made to examples of activated and deactivated buffers provided in FIG. 4 and FIG. 5, respectively.

Routine 100 may be executed by DBMS 28, and in particular, by database engine 44, and generally illustrates a push model. However, those of ordinary skill in the art will appreciate that exemplary routine 100 may be modified to implement a pull model, for instance, by reversing the directions mentioned in routine 100. As an example, block 150 in routine 100 (i.e., the push model) indicates that a downstream buffer should be switched to buffer mode, and this instruction may be modified to switching an upstream buffer to buffer mode in the pull model.

Turning now to block 105 of routine 100, execution plan 50 may be generated in block 105. Next, in block 110, execution plan 50 may include an instruction to activate the buffer at one of the buffer positions, such as buffer 25, from buffer group 60 by switching the mode of the buffer to buffer mode. The buffer may be a switch buffer that can switch between an activated functioning buffer (i.e., buffer mode or on mode) to a deactivated nonfunctioning buffer (i.e., dummy pass mode or off mode). When the buffer is switched to dummy pass mode, data is not temporarily stored and simply passes through to the threads.

In particular, the buffer may internally have a switch between a normal buffer object and dummy object. The normal buffer object may produce or feed the execution tree above the buffer position with data, while the dummy object is akin to a NOOP node or a no operation node and allows data flow through to the execution tree above. The buffer may also contain a reference to other upstream and/or downstream switch buffers in the same buffer group.

Figure 4:
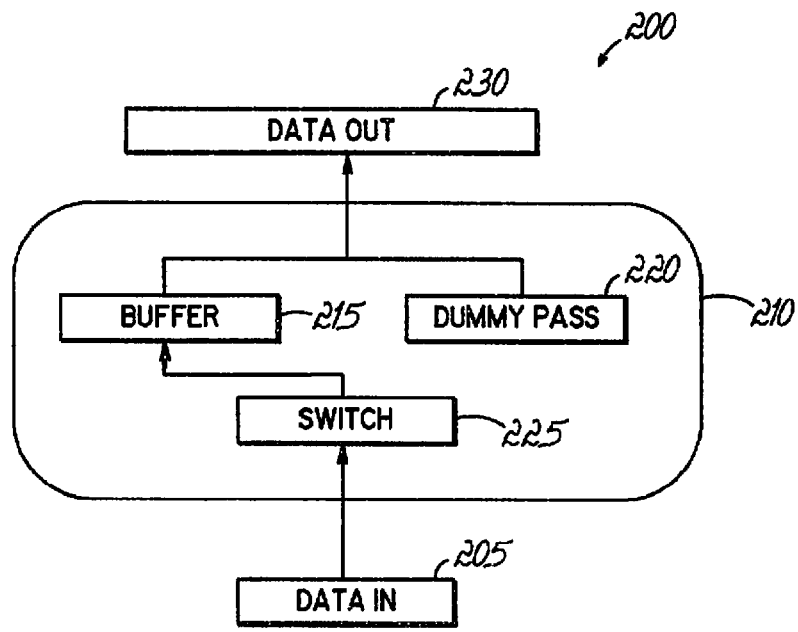
FIG. 4 is a block diagram illustrating an example of a dynamically activatable buffer consistent with the invention, shown in an activated state.

The buffer will be activated at the buffer position at the beginning of query execution in block 115. FIG. 4 illustrates an example 200 of an activated buffer 210. In particular, switch 225 is set to buffer mode 215, instead of dummy pass mode 220. Therefore, when data from block 205 enters activated buffer 210, the data is temporarily stored in buffer 210 and then produced in block 230 for consumption by the threads.

Next, in block 120, the consumption of data by the available threads may be monitored. In particular, information such as the quantity of threads waiting to consume data, the quantity of threads being utilized to execute the execution plan, the amount of time when data is not produced for consumption, number of cycles utilized, etc. may be monitored. Consumption statistics and other predefined criteria may also be monitored during execution. Based upon the monitored information, multiple comparisons may be performed to determine whether to dynamically deactivate the buffer that is activated.

Specifically, control may pass from block 120 to block 125 to begin to compare the production rate and the consumption rate. In block 125, the quantity of threads waiting to consume data and the quantity of threads being utilized to execute the execution plan may be utilized in the following formula N(WAIT)/N(TOTAL) for the comparison. The N(WAIT) portion of the formula may indicate the number of parallel threads that are waiting for data to be produced or fed to the threads. The N(TOTAL) portion of the formula indicates the total number of parallel threads. The result of the formula may be compared to a threshold, which may be a value that is manually retrieved from a user, automatically generated by DBMS, etc. If the result of the formula exceeds the threshold, the consumption rate may be greater than the production rate, in other words, the consumption of data by the threads may be too rapid (block 130).

When the threshold is exceeded, and remains so for a period of time, control passes to block 135 to determine if the activated buffer is the most downstream in the buffer group in the execution tree. Whether or not the activated buffer is the most downstream buffer in the buffer group may be determined by its buffer position in the buffer group. If the activated buffer is already the most downstream buffer (i.e., already at the most downstream buffer position), it may not be possible to shrink the feeding tree any further so that less processing is done in serial, and therefore there may be no need to deactivate the activated buffer.

In particular, those of ordinary skill in the art may appreciate that although it may be detected from the monitored information that the production rate is not balanced with the consumption rate, if the activated buffer is already at a more optimal buffer position, it may not be advantageous to activate a different buffer in the buffer group at a different buffer. Instead, control may pass to block 140 to dynamically adjust the degree of parallelism. The degree of parallelism may be adjusted based on the current degree of parallelism, system capacity, etc. As such, even though the activated buffer is already at a more optimal buffer position, adjusting the degree of parallelism may improve performance by further maximizing resource utilization. Next, control may pass to block 120 to continue to monitor the consumption of data by the available threads.

Returning to block 135, if the activated buffer is not the most downstream buffer in the buffer group, control may pass to block 145 to select another buffer in the buffer group that is downstream of the activated buffer (i.e., at a buffer position downstream of the activated buffer). The downstream buffer may be dynamically activated, which in turn may cause the feeding tree to shrink. In particular, control passes to block 155 to switch the downstream buffer at the downstream buffer position to buffer mode and to deactivate the previously activated buffer to dummy mode. It is worth noting that in some embodiments, one and only one of the buffers in the buffer group may be activated at any given time.

Figure 5:
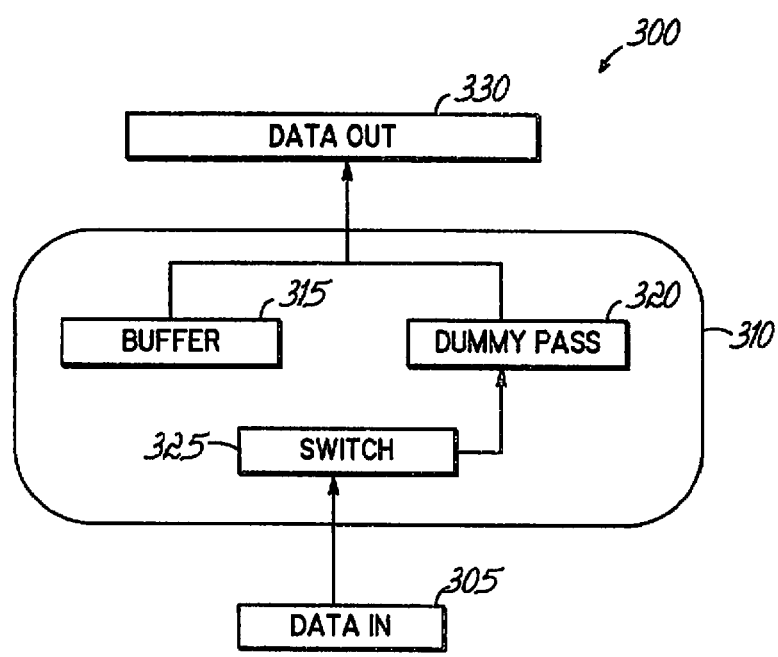
FIG. 5 is a block diagram illustrating an example of a dynamically activatable buffer consistent with the invention, shown in a deactivated state.

FIG. 5 illustrates an example 300 of a deactivated buffer 310. In particular, switch 325 is set to dummy pass mode 320, instead of buffer mode 315. Therefore, when data from block 305 enters deactivated buffer 310, the data simply passes through and is produced in block 330 for consumption by threads.

Next, the parallel threads may be regenerated in block 155. In particular, the parallel threads may be regenerated to receive data from the newly activated buffer at the downstream buffer position instead of the deactivated buffer. Those of ordinary skill in the art may appreciate, however, that the deactivation of one buffer and activation of another buffer, as well as the regeneration of the threads or a portion of the threads, should be coordinated to occur in a manner that avoids any errors or data loss (e.g., the data from the activated buffer should be completely consumed to avoid errors) caused by the dynamic adjustments. Control may then pass to block 120 continue to monitor the consumption of data by the available threads.

Returning to block 125, if the threshold is not been exceeded, control may pass to block 160 to perform another comparison based on the amount of time when data is not produced for consumption. Specifically, if T(IDLE), which may represent the time that the feeding tree is idle because no parallel threads are driving the tree to get more rows or tuples, exceeds a threshold, the consumption of data may be too slow (block 165) compared to the rate of production. As such, control may then pass to block 170 to determine if the activated buffer is the most upstream in the buffer group in the execution tree. Whether or not the buffer is the most upstream buffer in the buffer group may be determined by its buffer position in the buffer group. If the activated buffer is already the most upstream buffer (i.e., already at the most upstream buffer position), it may not be possible to expand the feeding tree any further so that more processing is done in serial; therefore, the activated buffer may not be deactivated even though the production rate may be greater than the consumption rate. Instead, control may pass to block 140 to dynamically adjust the degree of parallelism, and then to block 120 to continue to monitor the consumption of data by the available threads.

Returning to block 170, if the activated buffer is not the most upstream buffer in the buffer group, control passes to block 175 to select another buffer in the buffer group that is upstream of the activated buffer (i.e., at a buffer position upstream of the activated buffer) to dynamically activate that upstream buffer. Next, control passes to block 180 to switch the upstream buffer at the upstream buffer position to buffer mode and to deactivate the previously activated buffer to dummy mode. The parallel threads may be regenerated in block 185, and control may pass to block 120 to continue to monitor the consumption of data by the available threads.

However, if the threshold is not exceeded in block 160, this may indicate that the rate of consumption is about balanced with the rate of production. Control may then pass to block 120 to continue to monitor consumption of data by the available threads.

Figure 6:
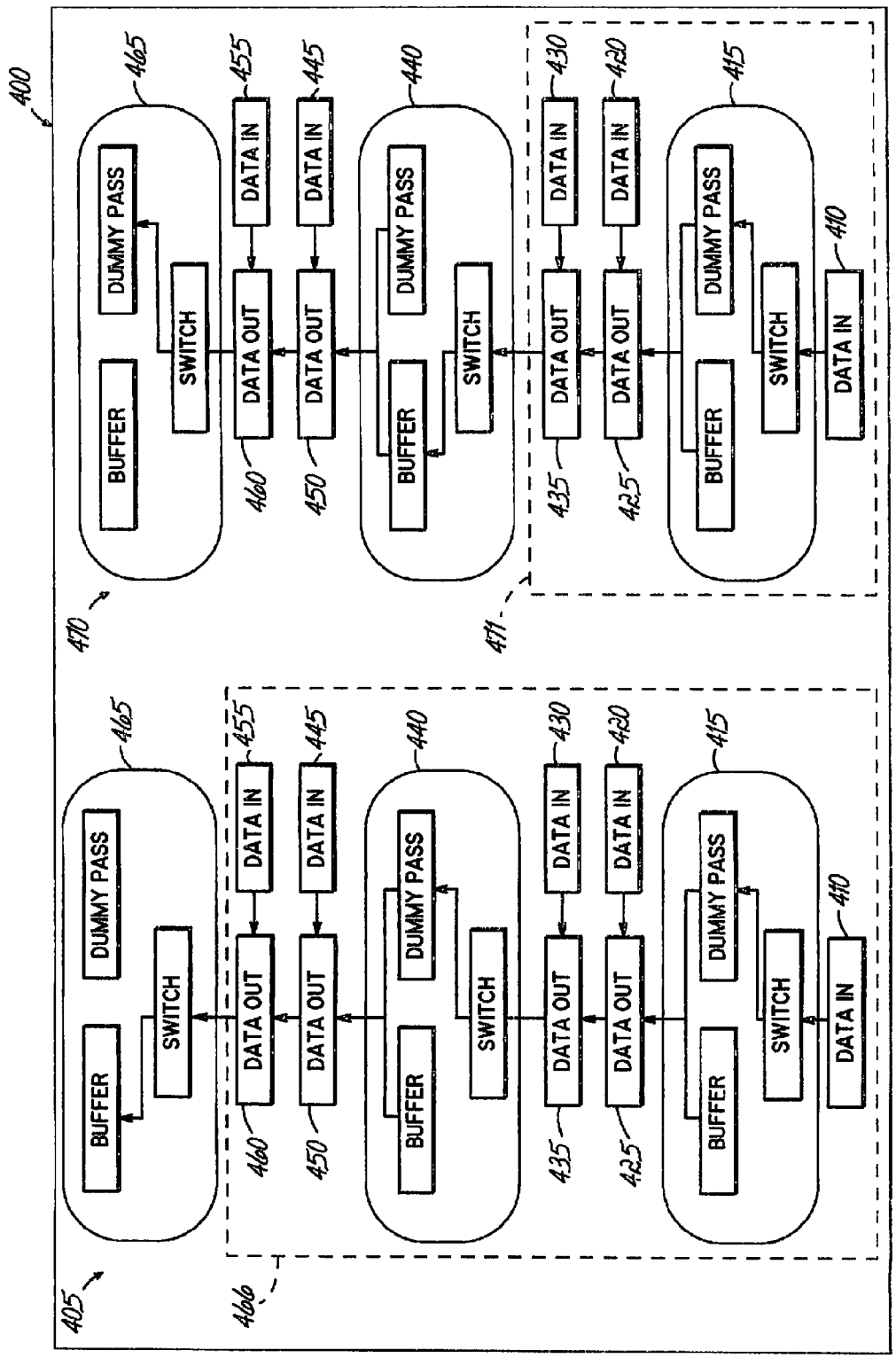
FIG. 6 is a block diagram illustrating an example of dynamic deactivation and activation of buffers using a push model where the consumption rate is greater than the production rate.

Turning next to FIG. 6, FIG. 6 is a block diagram that illustrates an example 400 of dynamic deactivation and activation of buffers using the push model where the consumption rate is greater than the production rate. Execution tree 505 illustrates a buffer group with buffers 415, 440, and 465 at three different buffer positions in the execution tree 405. During optimization, it may have been determined that buffer 465 would be activated at that buffer position, not buffers 415 and 440 at their positions. Dashed box 466 illustrates the nonparallel feeding tree.

Next, based on the monitor information during runtime, it may be determined that the rate of consumption is greater than the rate of production (i.e., the data is consumed too quickly), and as activated buffer 465 is not the most downstream buffer in the buffer group, a different buffer may be dynamically selected for activation. Execution tree 470 illustrates the newly activated buffer 440 in the buffer group. In particular, buffer 465 was deactivated by setting the switch to dummy pass mode, while downstream buffer 465 was activated by setting the switch to buffer mode. Next, the threads may be regenerated. By dynamically adjusting the buffer from the buffer group that is activated, the feeding tree may be shrunk. As such, the consumption rate may become more balanced with the production rate and improve query performance. In particular, less processing may be performed in serial by the execution feeding tree and the parallel processing portion may become slower.

Figure 7:
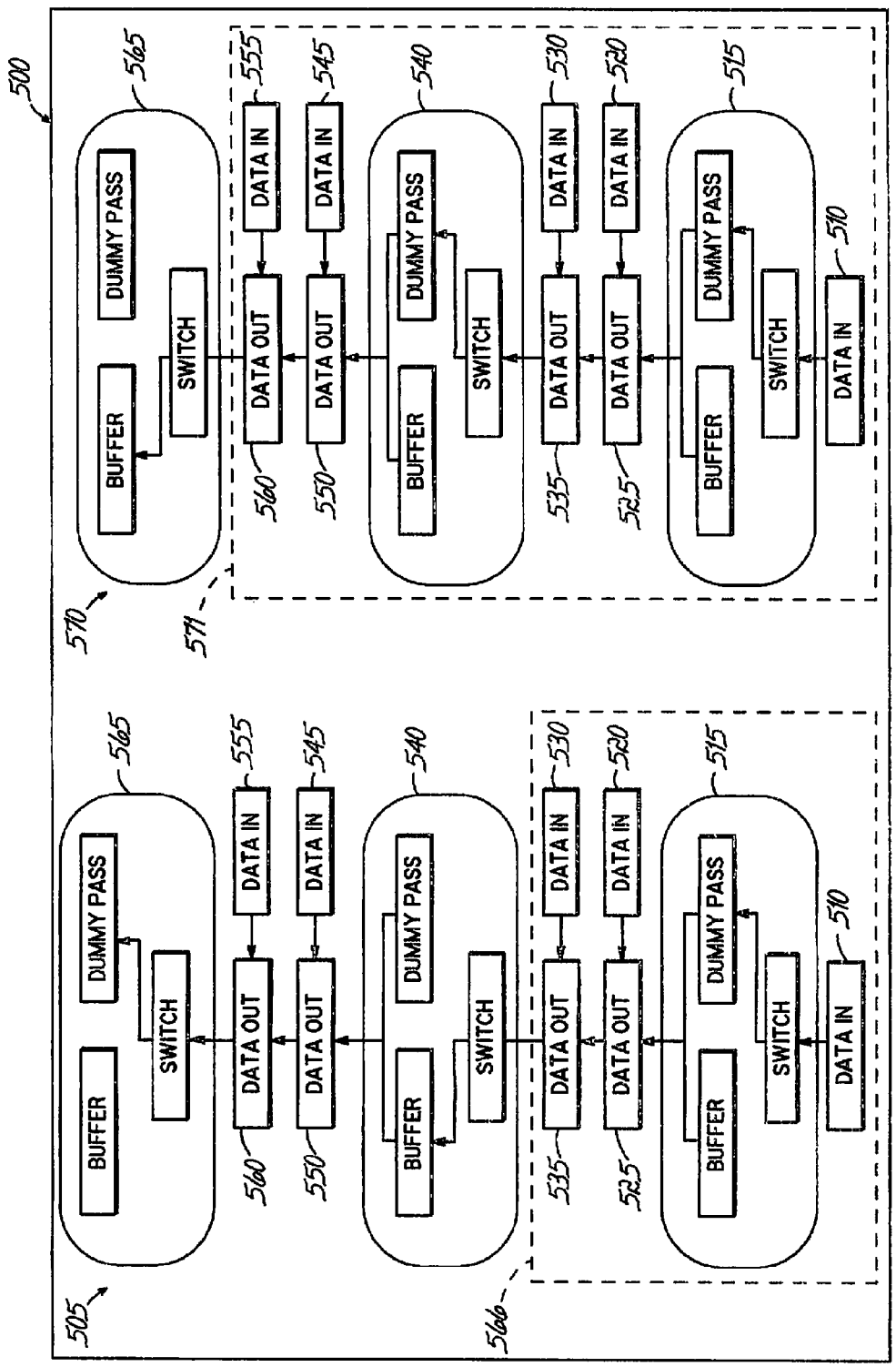
FIG. 7 is a block diagram illustrating an example of dynamic deactivation and activation of buffers using a push model where the production rate is greater than the consumption rate.

FIG. 7 is a block diagram that illustrates an example 500 of dynamic deactivation and activation of buffers using the push model where the production rate is greater than the consumption rate. As above, execution tree 505 illustrates a buffer group with buffers 515, 540, and 565 at three different buffer positions in execution tree 505. During optimization, it may have been determined that the buffer 540 would be activated, not buffers 515 and 565. Dashed box 566 illustrates a nonparallel feeding tree.

Next, based on the monitor information during runtime, it may be determined that the rate of production is greater than the rate of consumption (i.e., the data is consumed too slowly), and as activated buffer 540 is not the most upstream buffer in the buffer group, a different buffer may be activated. Execution tree 570 illustrates the newly activated buffer 565 in the buffer group. In particular, buffer 540 was deactivated by setting the switch to dummy pass mode, while upstream buffer 565 was activated by setting the switch to buffer mode. Next, the threads may be regenerated. By dynamically adjusting the buffer from the buffer group that is activated, the feeding tree may be expanded. As such, the production rate may become more balanced with the consumption rate and improve query performance. In particular, more processing may be performed in serial by the execution feeding tree and the parallel processing portion may become relatively faster.

Figure 8A:
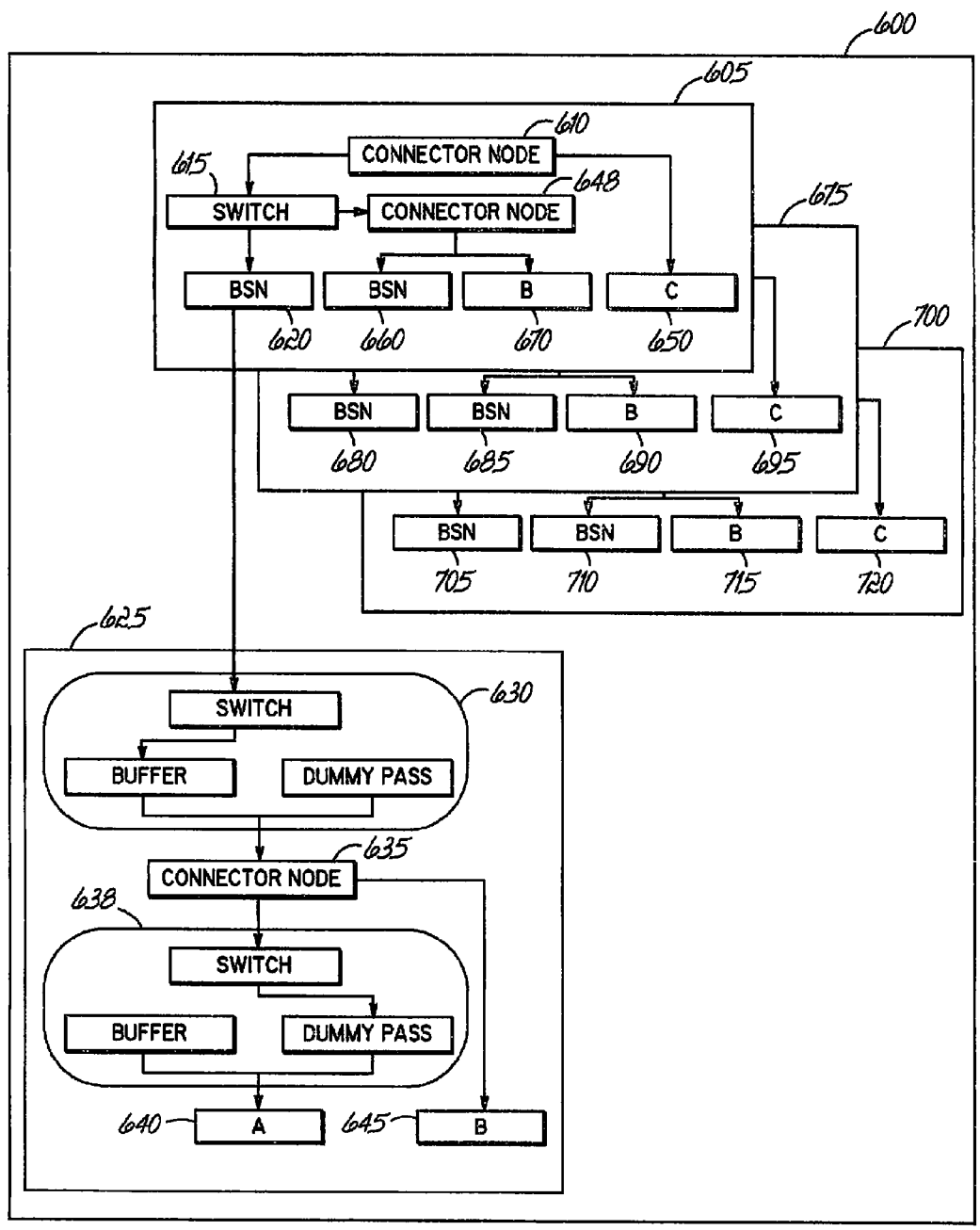
FIG. 8A is a block diagram illustrating an example prior to dynamic deactivation and activation of buffers using a pull model where the production rate is greater than the consumption rate.
Figure 8B:
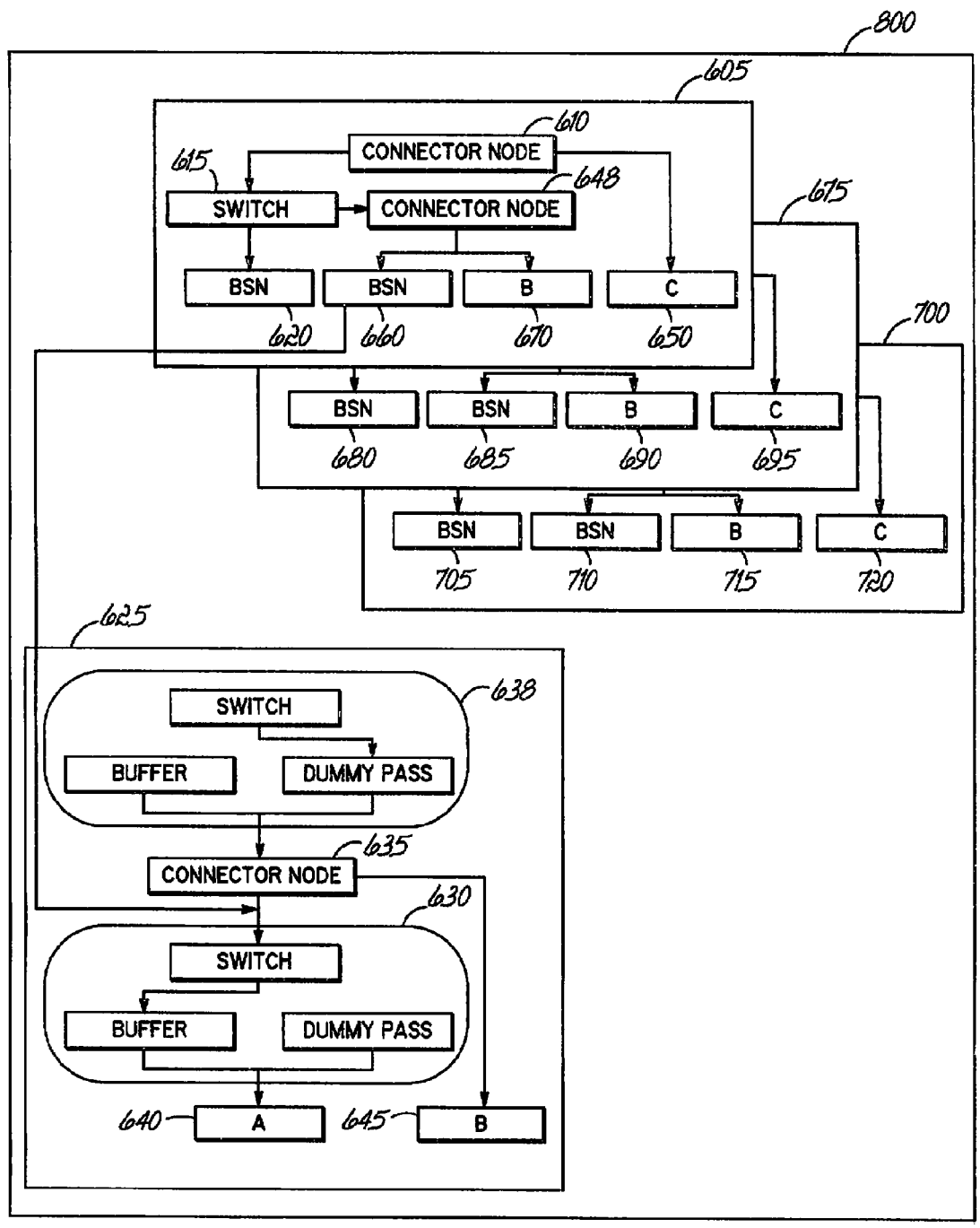
FIG. 8B is a block diagram illustrating an example after dynamic deactivation and activation of buffers using a pull model where the production rate is greater than the consumption rate

FIGS. 8A and 8B are block diagrams illustrating an example 600 prior to and an example 800 after dynamic deactivation and activation of buffers using the push model, respectively, where the production rate is greater than the consumption rate. For this example, the left-most node of accessing tree 605 of the execution tree cannot be executed directly in parallel because its data source (table A) is not uniformly divisible, and so access to it must be serialized. Nonetheless, since the buffered subtree 625 is accessed serially, it may become a bottleneck for the accessing trees 605, 675, and 700 because if subtree 625 does not produce enough tuples or rows, then the accessing trees may not have enough data to consume, resulting in reduced parallelism and query performance. If the production of tuples by subtree 625 takes too much time (e.g., too much work is performed serially), then the accessing trees may be blocked as well.

Nonetheless, controlling logic may be added to monitor the progress of the executing parallel query, and conditionally move work between the parallel portion of the query (accessing subtrees) and the serial portion (buffer) for buffered subtree 625 and accessing trees 605, 675, and 700 consistent with the principles of the present invention. The work may be performed as a join between table A and table B. For example, the join may be performed in connection with connector node 635 in subtree 625 or in connection with connector node 648 of accessing tree 605. However, the switching of this work, buffer adjustments, regeneration of threads, etc. should be orchestrated properly to avoid producing incorrect output.

Turning to example 600 in FIG. 8A, specifically, during optimization, it may have been determined that the join of table A and table B will be executed in subtree 625, thus, switch 615 of accessing tree 605 will divert the join to subtree 625. The left-most subtree 625 includes an activated buffer 630, which was activated due to the execution plan, and a deactivated buffer 638. Buffers 630 and 638 are in the same buffer group. As such, accessing tree 605 uses the buffers of subtree 625 via buffer scan nodes (bsn) 620 to obtain tuples or rows of the join of table A in block 640 and table B in block 645, and fanouts thereof, via connector node 635 that can then be used by the accessing tree for further processing. This processing may include a join with table C in block 650 via connector node 610, plus subsequent activity like sorting, or hashing.

However, during runtime, the monitored information may indicate that the production rate may be greater than the consumption rate. For instance, too much data from the join of table A and table B is being produced by subtree 625 for consumption by accessing tree 605. Thus, it may be advantageous to perform the join elsewhere, and the join of table A and table B may be dynamically moved to accessing 605 for further joining with Table C of block 650. As only data from table A may be required by accessing tree 605 to perform the join in accessing table 605, the production rate may become more balanced with the consumption rate if the amount of data produced can be reduced to data only from table A instead of the join of table A and B.

As illustrated by example 800 in FIG. 8B, buffer 638 at a different buffer position may be dynamically activated and buffer 630 may be dynamically deactivated. After activation, data from table A of block 640 may be buffered by buffer 630 and provided to bsn 660. Switch 615 in accessing tree 605 may also be dynamically adjusted such that data from the subtree produced to bsn 660 instead of bsn 620. After access tree 605 receives data from sub-tree 625 via bsn 660, the data is joined with table B of block 670 via connector node 648, and the resulting data may be joined with table C of block 650 via connector node 610. As such, the production rate may be more balanced with the consumption rate.

The other accessing trees 675 and 700 may be similarly processed. Moreover, this example, as well as the others discussed herein may be extrapolated to more complex queries, potentially resulting in subsequent performance benefits. Furthermore, those of ordinary skill in the art may appreciate that via the principles the present invention query execution may be improved by the dynamic adjustment of the buffers such that the production rates is more balanced or about balanced with the consumption rate, and vice versa. Thus, the parallel execution threads are consuming sufficient data and are not too busy utilizing data so that the feeding tree, which produces data for the parallel threads, is idle for too long. The adjustment may be system driven in automated manner based on the runtime feedback and may result in more efficient system resource utilization.

Various modifications may be made to illustrated embodiments without departing from the spirit and scope of the invention. Therefore, the invention lies in the claims hereinafter appended.

What is claimed is:

1. A method of processing a database query utilizing a plurality of threads, the method comprising:
    executing an access plan for the database query using the plurality of threads, wherein the access plan includes a plurality of buffer positions, with a first buffer at a first buffer position activated to buffer intermediate results during execution of the access plan;
    monitoring information associated with the consumption of data by the plurality of threads during execution of the access plan;
    dynamically deactivating the first buffer at the first buffer position and activating a second buffer at a second buffer position based on the monitoring to improve the consumption of data by the plurality of threads during execution of the access plan; and
    continuing to execute the access plan after the second buffer is activated such that intermediate results are buffered at the second buffer position by the second buffer instead of at the first buffer position by the first buffer.

2. The method of claim 1, wherein continuing to execute the access plan after the second buffer is activated further comprises regenerating at least a portion of the plurality of threads to utilize the second buffer at the second buffer position.

3. The method of claim 1, wherein dynamically deactivating the first buffer at the first buffer position and activating the second buffer at the second buffer position further comprises selecting the second buffer from a group of buffers that includes the first buffer, wherein at least a portion of the buffers in the group of buffers correspond to buffer positions in the plurality of buffer positions.

4. The method of claim 1, wherein the monitored information includes at least one of a quantity of threads waiting to consume data, a quantity of threads being utilized to execute the access plan, an amount of time when data is not produced for consumption, or number of cycles utilized.

5. The method of claim 1, further comprising determining whether to deactivate the first buffer, wherein dynamically deactivating is performed in response to determining that the first buffer should be deactivated.

6. The method of claim 5, wherein determining whether to deactivate is based upon a comparison of a production rate and a consumption rate, wherein the production rate is based on the monitored information and is indicative of how often the data is produced by the plurality of buffers at the plurality of buffer positions, and wherein the consumption rate is based on the monitored information and is indicative of how often the plurality of threads consume the data from the plurality of buffers at the plurality of buffer positions.

7. The method of claim 6, wherein when the production rate is proximate the consumption rate, determining not to deactivate the first buffer.

8. The method of claim 1, further comprising dynamically adjusting a level of parallelism of the plurality of threads based upon at least one of a current level of parallelism or system capacity.

9. The method of claim 6, wherein when the consumption rate is greater than the production rate, selecting a buffer from a group of buffers containing the first buffer to activate as the second buffer, wherein the selected buffer is at a buffer position that decreases processing of the database query in serial, wherein at least a portion of the buffers in the group of buffers correspond to buffer positions in the plurality of buffer positions.

10. The method of claim 9, further comprising determining whether the first buffer is at a buffer position in the group of buffers that optimally decreases processing of the database query in serial.

11. The method of claim 6, wherein when the production rate is greater than the consumption rate, selecting a buffer from a group of buffers containing the first buffer to activate as the second buffer, wherein the selected buffer is at a buffer position that increases processing of the database query in serial, wherein at least a portion of the buffers in the group of buffers correspond to buffer positions in the plurality of buffer positions.

12. The method of claim 11, further comprising determining whether the first buffer is at a buffer position in the group of buffers that optimally increases processing of the database query in serial.

13. An apparatus comprising:
a processor, a memory; and
program code resident in the memory and configured to be executed by the processor to process a database query utilizing a plurality of threads by executing an access plan for the database query using the plurality of threads, wherein the access plan includes a plurality of buffer positions, with a first buffer at a first buffer position activated to buffer intermediate results during execution of the access plan; monitoring information associated with the consumption of data by the plurality of threads during execution of the access plan; dynamically deactivating the first buffer at the first buffer position and activating a second buffer at a second buffer position based on the monitoring to improve the consumption of data by the plurality of threads during execution of the access plan; and continuing to execute the access plan after the second buffer is activated such that intermediate results are buffered at the second buffer position by the second buffer instead of at the first buffer position by the first buffer.

14. The apparatus of claim 13, wherein the program code is further configured to continue to execute the access plan after the second buffer is activated by regenerating at least a portion of the plurality of threads to utilize the second buffer at the second buffer position.

15. The apparatus of claim 13, wherein the program code is further configured to dynamically deactivate the first buffer at the first buffer position and activate the second buffer at the second buffer position by selecting the second buffer from a group of buffers that includes the first buffer, wherein at least a portion of the buffers in the group of buffers correspond to buffer positions in the plurality of buffer positions.

16. The apparatus of claim 13, wherein the monitored information includes at least one of a quantity of threads waiting to consume data, a quantity of threads being utilized to execute the access plan, an amount of time when data is not produced for consumption, or number of cycles utilized.

17. The apparatus of claim 13, wherein the program code is further configured to determine whether to deactivate the first buffer, wherein the program code is further configured to dynamically deactivate in response to determining that the first buffer should be deactivated.

18. The apparatus of claim 17, wherein the program code is further configured to determine whether to deactivate based upon a comparison of a production rate and a consumption rate, wherein the production rate is based on the monitored information and is indicative of how often the data is produced by the plurality of buffers at the plurality of buffer positions, and wherein the consumption rate is based on the monitored information and is indicative of how often the plurality of threads consume the data from the plurality of buffers at the plurality of buffer positions.

19. The apparatus of claim 18, wherein the program code is further configured to determine not to deactivate the first buffer when the production rate is proximate the consumption rate.

20. The apparatus of claim 13, wherein the program code is further configured to dynamically adjust a level of parallelism of the plurality of threads based upon at least one of a current level of parallelism or system capacity.

21. The apparatus of claim 18, wherein the program code is further configured to select a buffer from a group of buffers containing the first buffer to activate as the second buffer when the consumption rate is greater than the production rate, wherein the selected buffer is at a buffer position that decreases processing of the database query in serial, wherein at least a portion of the buffers in the group of buffers correspond to buffer positions in the plurality of buffer positions.

22. The apparatus of claim 21, wherein the program code is further configured to determine whether the first buffer is at a buffer position in the group of buffers that optimally decreases processing of the database query in serial.

23. The apparatus of claim 18, wherein the program code is further configured to select a buffer from a group of buffers containing the first buffer to activate as the second buffer when the production rate is greater than the consumption rate, wherein the selected buffer is at a buffer position that increases processing of the database query in serial, wherein at least a portion of the buffers in the group of buffers correspond to buffer positions in the plurality of buffer positions.

24. The apparatus of claim 23, wherein the program code is further configured to determine whether the first buffer is at a buffer position in the group of buffers that optimally increases processing of the database query in serial.

25. A program product, comprising:
program code configured to process a database query utilizing a plurality of threads by executing an access plan for the database query using the plurality of threads, wherein the access plan includes a plurality of buffer positions, with a first buffer at a first buffer position activated to buffer intermediate results during execution of the access plan; monitoring information associated with the consumption of data by the plurality of threads during execution of the access plan;
dynamically deactivating the first buffer at the first buffer position and activating a second buffer at a second buffer position based on the monitoring to improve the consumption of data by the plurality of threads during execution of the access plan;
and continuing to execute the access plan after the second buffer is activated such that intermediate results are buffered at the second buffer position by the second buffer instead of at the first buffer position by the first buffer; and
a recordable computer readable medium bearing the program code.

* * * * *